US008556293B2

(12) United States Patent
Baca et al.

(10) Patent No.: US 8,556,293 B2
(45) Date of Patent: Oct. 15, 2013

(54) BUCKLE CONNECTORS FOR INFLATABLE PERSONAL RESTRAINTS AND ASSOCIATED METHODS OF USE AND MANUFACTURE

(75) Inventors: Andre Baca, Laveen, AZ (US); Ronald A. Shields, Mesa, AZ (US)

(73) Assignee: AmSafe, Inc., Phoenix, AZ (US)

( * ) Notice: Subject to any disclaimer, the term of this patent is extended or adjusted under 35 U.S.C. 154(b) by 43 days.

(21) Appl. No.: 13/227,392

(22) Filed: Sep. 7, 2011

(65) Prior Publication Data
US 2012/0292893 A1 Nov. 22, 2012

Related U.S. Application Data

(63) Continuation-in-part of application No. 29/392,028, filed on May 16, 2011.

(51) Int. Cl.
*B60R 21/18* (2006.01)

(52) U.S. Cl.
USPC .......................................................... 280/733

(58) Field of Classification Search
USPC ................ 280/728.1, 733, 801.1; 244/122 R; 24/164, 602, 633
See application file for complete search history.

(56) References Cited

U.S. PATENT DOCUMENTS

| | | | |
|---|---|---|---|
| 3,766,612 A | 10/1973 | Hattori | |
| 4,741,574 A * | 5/1988 | Weightman et al. | 297/482 |
| 5,984,350 A * | 11/1999 | Hagan et al. | 280/735 |
| 6,325,412 B1 | 12/2001 | Pan | |
| 6,442,807 B1 | 9/2002 | Adkisson | |
| 6,951,350 B2 | 10/2005 | Heidorn et al. | |
| 2003/0015863 A1* | 1/2003 | Brown et al. | 280/733 |
| 2007/0080528 A1* | 4/2007 | Itoga et al. | 280/733 |
| 2010/0115737 A1 | 5/2010 | Foubert | |

OTHER PUBLICATIONS

Amsafe, Inc., International Search Report and Written Opinion dated Mar. 2, 2012, International Application No. PCT/US2011/056776, 8 pages.

* cited by examiner

*Primary Examiner* — Joseph Rocca
*Assistant Examiner* — Robert A Coker
(74) *Attorney, Agent, or Firm* — Perkins Coie LLP

(57) ABSTRACT

Buckle connectors and airbag assemblies for inflatable personal restraints, and associated methods of use and manufacture are described herein. In one embodiment, an inflatable personal restraint system for use in an aircraft includes a web configured to restrain an occupant in a seat, a connector attached to a distal end portion of the web, and an airbag carried by the web. The restraint system further includes an airbag cover at least partially enclosing the airbag and engaging a portion of the connector. The connector can include a tongue portion configured to be releasably engaged with a corresponding buckle to secure the web around a portion of the occupant.

18 Claims, 4 Drawing Sheets

BUCKLE CONNECTORS FOR INFLATABLE PERSONAL RESTRAINTS AND ASSOCIATED METHODS OF USE AND MANUFACTURE

CROSS-REFERENCE TO RELATED APPLICATIONS INCORPORATED BY REFERENCE

This application is a continuation-in-part of U.S. Design patent application No. 29/392,028, filed May 16, 2011, and entitled "CONNECTOR FOR A SEATBELT AIRBAG," which is hereby incorporated by reference in its entirety. The subject matter of the following U.S. patent applications and U.S. patents are incorporated into the present application in their entireties by reference: U.S. patent application Ser. No. 13/227,382, filed concurrently herewith, and entitled "ACTIVATION SYSTEMS FOR INFLATABLE PERSONAL RESTRAINT SYSTEMS;" U.S. patent application Ser. No. 13/170,079, filed Jun. 27, 2011, and entitled "SENSORS FOR DETECTING RAPID DECELERATION/ACCELERATION EVENTS;" U.S. patent application Ser. No. 13/086,134, filed Apr. 13, 2011, and entitled "STITCH PATTERNS FOR RESTRAINT-MOUNTED AIRBAGS AND ASSOCIATED SYSTEMS AND METHODS;" U.S. Pat. No. 5,984,350; and U.S. Pat. No. 6,442,807.

TECHNICAL FIELD

The following disclosure relates generally to buckle connectors for inflatable personal restraint systems and associated methods of use and manufacture.

BACKGROUND

Various types of seat belt and airbag systems have been used to protect passengers in automobiles, aircraft and other vehicles. In automobiles, airbags typically deploy from the steering column, dashboard, side panel, and/or other fixed location. During a rapid deceleration event (e.g., a collision), a sensor detects the event and transmits a corresponding signal to an initiation device (e.g., a pyrotechnic device) on an airbag inflator. Initiation causes the inflator to release compressed gas into the airbag via a hose, thereby rapidly inflating the airbag. There are a number of different types of inflators known in the art. Some inflators contain compressed gas (e.g., air, nitrogen, helium, argon, etc.). Other inflators (e.g., gas generating devices) provide high pressure gas via chemical reaction of an energetic propellant.

Airbags can be deployed in a number of positions around the vehicle passenger or driver. Airbags positioned in the steering column, for example, can inflate in front of the driver to cushion his head and torso from forward impact. Airbags can also reduce the likelihood of whiplash.

Although airbags that deploy from stationary locations (e.g., a steering column) may be effective in automobiles, they may not be as effective in other types of vehicles having other seating arrangements. Seats in commercial passenger aircraft, for example, can be configured in a variety of layouts that provide different spacing between succeeding rows and adjacent seats. Moreover, such layouts may lack the availability of stationary structures upon which to mount airbags. Additionally, seatbacks in aircraft may rotate forward and downward during a crash or similar event, and thus may be unsuitable for airbag storage. As a result, airbags have been developed that deploy from seat belts to accommodate occupants in aircraft and other vehicles. Such airbags can deploy from, for example, a lap belt and/or a shoulder belt to provide additional protection during a crash or other rapid deceleration event. Such airbag systems are described in detail in U.S. Pat. No. 5,984,350, which is owned by the assignee of the present application and is incorporated herein in its entirety by reference.

Some airbag systems include wiring coupled to the seat belt connector that transmits electrical signals about the status (e.g., open or closed) of the seat belt buckle. Repeated flexing of the seat belt and the wires during use can subject the wires to stress and strain. Accordingly, it could be desirable to reduce this stress and strain.

DETAILED DESCRIPTION

The present disclosure describes various embodiments and aspects of buckle connectors for inflatable personal restraint systems and associated systems and methods. In one embodiment, a personal restraint system includes a web configured to restrain an occupant in a seat, a connector attached to a distal end portion of the web, an airbag carried by the web, and an airbag cover at least partially enclosing the airbag and engaging a portion of the connector. In some embodiments, the connector can include a housing having one or more recesses that receive an end portion of the airbag cover to retain the cover in position and provide strain relief for any associated wiring to the connector. Certain details are set forth in the following description and in FIGS. 1-4 to provide a thorough understanding of various embodiments of the disclosure. Other details describing well-known structures and systems often associated with airbags, buckle assemblies, restraint systems, etc., have not been set forth below to avoid unnecessarily obscuring the description of the various embodiments of the disclosure.

Many of the details, dimensions, angles and other features shown in FIGS. 1-4 are merely illustrative of particular embodiments of the disclosure. Accordingly, other embodiments can add other details, dimensions, angles and features without departing from the spirit or scope of the present technology. In addition, those of ordinary skill in the art will appreciate that further embodiments of the technology can be practiced without several of the details described below. The discussion related to FIG. 1 includes a broad description of inflatable personal restraint systems. The discussion related to FIGS. 2-4 describes several features more specific to connector portions of inflatable personal restraint systems configured in accordance with the present technology.

Figure 1:
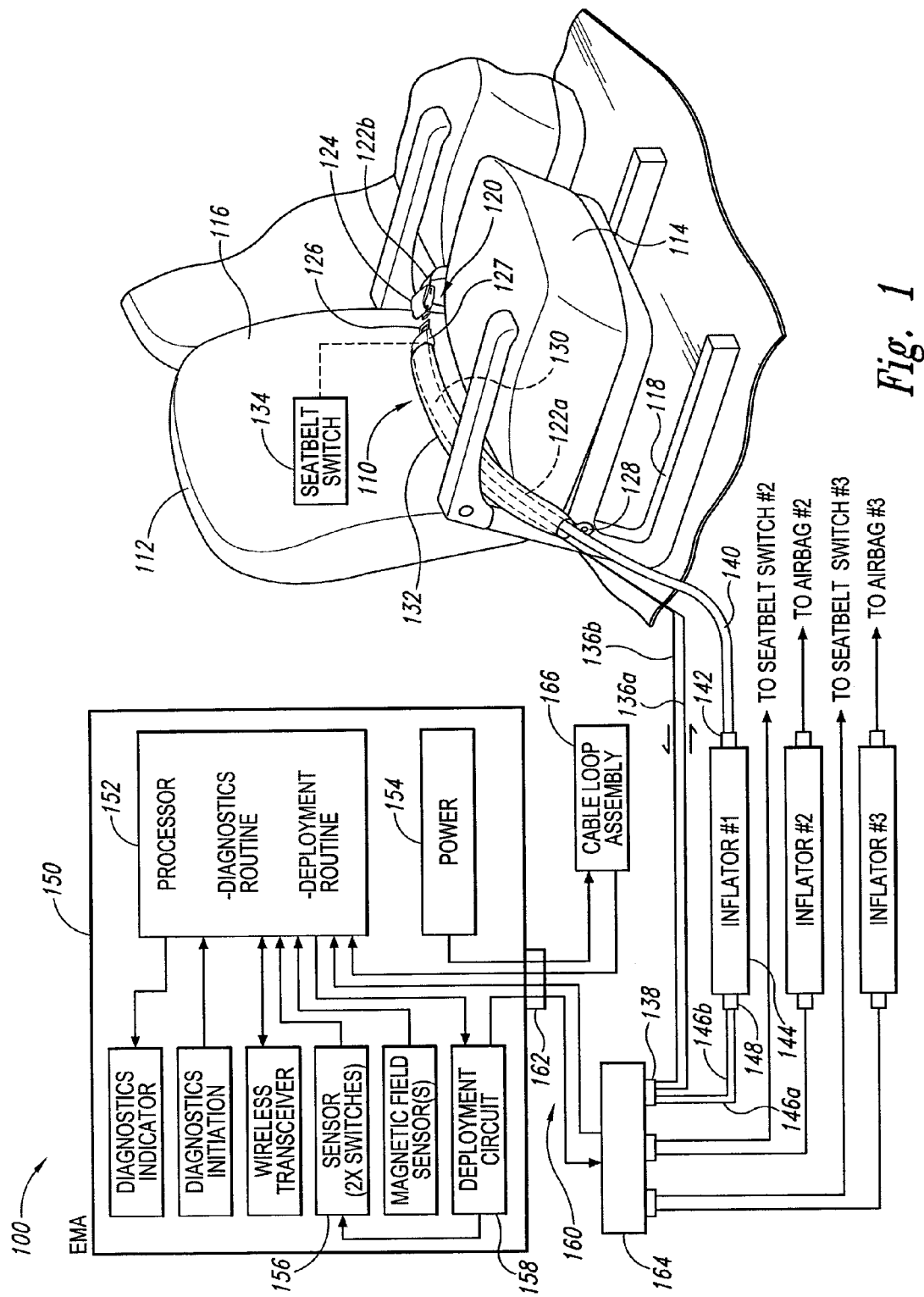
FIG. 1 is a partially schematic isometric view of a seating area in a vehicle having one or more seats provided with an inflatable personal restraint system configured in accordance with an embodiment of the present technology.

FIG. 1 is a partially schematic isometric view of a seating area in a vehicle (e.g., an aircraft) having one or more seats 112 provided with an inflatable personal restraint system 100 ("restraint system 100") configured in accordance with an embodiment of the present technology. In one aspect of the illustrated embodiment, the seats 112 can be at least generally similar to conventional seats in, for example, a commercial aircraft. Accordingly, each of the seats 112 includes a back portion 112 extending upwardly from a seat portion 114, and each seat 112 is fixedly attached to the floor of the aircraft by a suitable mounting structure 118. Although certain embodiments of the present technology are described herein in the context of personal restraint systems for use in commercial aircraft, those of ordinary skill in the art will appreciate that the various structures and features of the airbag systems described herein can also be utilized in a wide variety of other vehicles, including other aircraft (e.g., private and military aircraft), ground vehicles (e.g., automobiles, trucks, buses, trains), water vehicles, etc.

In another aspect of the illustrated embodiment, the restraint system 100 includes an airbag assembly 110 carried by a seat belt 120. More specifically, in the illustrated embodiment the seat belt 120 includes a first web portion 122a and a corresponding second web portion 122b. A proximal end portion of the first web portion 122a can be fixably attached to the seat-mounting structure 118 by means of a hook 128 or other suitable device known in the art. The proximal end portion of the second web portion 122b can be similarly attached to the mounting structure 118 on the opposite side of the seat 112. The distal end portion of the first web portion 122a can carry a first coupler, such as a connector assembly or connector 126 having a tongue portion. Similarly, the distal end portion of the second web portion 122b can carry a corresponding second coupler, such as a buckle assembly or buckle 124 configured to receive and releasably engage the tongue portion of the connector 126 to couple the two web portions 122 together around a seat occupant (not shown) in a conventional manner. In certain embodiments, the connector 126 and the buckle 124 can be configured to engage and disengage in a manner that is at least generally similar to conventional connector/buckle assemblies found on conventional seat belts. As described in greater detail below, in other embodiments the connector 126 and the buckle 124 can include features that preclude the connector 126 or the buckle 124 from being inadvertently joined to a different buckle or connector, respectively.

In a further aspect of the illustrated embodiment, the airbag assembly 110 includes an airbag 130 that is attached to the first web portion 122a generally proximate the connector 126. In one embodiment, for example, the airbag 130 can be fastened to the first web portion 122a using the methods and systems disclosed in U.S. patent application Ser. No. 13/086,134, which was filed Apr. 13, 2011, and is incorporated herein in its entirety by reference. In FIG. 1, the airbag 130 is illustrated in the nondeployed configuration in which it is folded and stowed neatly beneath a flexible and durable cover 132. The cover 132 encloses the airbag 130 and the first web portion 122a, and extends from a back shell 127 on the connector 126 to proximate the hook 128. The cover 132 includes one or more tear seams (not shown) which are designed to rupture upon airbag inflation enabling the airbag 130 to fully inflate. In some embodiments, the cover 132 can comprise a segment of material, such as leather, having edges that contact one another along a longitudinal seam to form a cylindrical sheath.

In another aspect of the illustrated embodiment, the airbag assembly 110 further includes an inflator hose 140 having a first end portion in fluid communication with the interior of the airbag 130 and a second end portion that carries a coupling 142. The coupling 142 is configured to be operably (e.g., threadably) engaged with an outlet of an airbag inflator 144.

Various types of inflators can be used with the airbag systems described herein. In certain embodiments, the inflator 144 can include a stored gas canister that contains compressed gas (e.g., compressed air, nitrogen, argon, helium, etc.) that can be released upon electrical initiation of a corresponding pyrotechnic device (e.g., a squib). Suitable inflators can be provided by, for example, Autoliv Inc. of Ogden Technical Center 3350 Airport Road Ogden, Utah, USA 84405. In other embodiments, other suitable inflator devices can be used without departing from the scope of the present disclosure. Such devices can include, for example, gas generator devices that generate high pressure gas through a rapid chemical reaction of an energetic propellant. Accordingly, the present disclosure is not limited to a particular type of inflator device.

In yet another aspect of the illustrated embodiment, the airbag assembly 110 includes a seat belt switch 134 (shown schematically in FIG. 1) carried on the web connector 126. In the illustrated embodiment, the seat belt switch 134 is configured to change status when the connector 126 is suitably engaged with the buckle 124. For example, in one embodiment of the present technology the seat belt switch 134 can be a "normally closed" switch (e.g., a normally closed reed switch) that "opens" when the connector 126 is engaged with the buckle 124. The opening of the reed switch 134 can be effectuated by a magnet (not shown) carried on the buckle 124. When the connector 126 is properly engaged with the buckle 124, the reed switch 134 is moved into the field of the magnet, thereby causing the switch 134 to open. In some embodiments, the switch 134 can be at least generally similar in structure and function to those described in U.S. patent application Ser. No. 13/227,382 entitled, "Activation Systems for Use in Inflatable Personal Restraint Systems", which has been filed concurrently herewith and is incorporated herein in its entirety by reference.

When the seat belt switch 134 is closed (i.e., when the connector 126 is not engaged with the buckle 124), the seat belt switch 134 completes a circuit comprised of a pair of wires including a first wire or lead 136a and a second wire or lead 136b. The first and second wires 136a, 136b terminate in an electrical connector 138. A second pair of wires 146a, 146b also terminates in the electrical connector 138. A distal end portion of the second pair of wires 146 carries an electrical connector 148 configured to be operably coupled to an igniter or bridge wire in the inflator 144. In other embodiments, the seat belt switch 134 can be a "normally open" switch (e.g., a normally open reed switch), that is magnetically closed when the connector 124 is properly engaged with the buckle 124.

In one embodiment, the airbag system 100 includes an electronic module assembly (EMA) 150 for controlling initiation and deployment of the airbag 130 during a rapid deceleration event (e.g., a crash) of sufficient magnitude. The EMA 150 is operably coupled to the airbag assembly 110 via a cable assembly 160. The cable assembly 160 includes a first connector 162 that is plugged in to the EMA 150 and a second connector 164 that provides a receptacle for the airbag electrical connector 138. In the illustrated embodiment, the EMA 150 includes a microprocessor 152 that receives electrical power from a power source 154 (e.g., one or more lithium batteries). In certain embodiments, the cable assembly 160 can include a cable loop 166 that completes the circuit from the power source 154 to the microprocessor 152. When employed in, for example, a commercial aircraft, the EMA 150 can be mounted to a rigid structure beneath the seat 112.

In another aspect of the illustrated embodiment, the EMA 150 includes a sensor 156 that detects rapid deceleration along a particular axis (e.g., an axis of forward motion of the vehicle). Moreover, in this embodiment the sensor 156 can include two individual sensor switches aligned with a common axis for redundancy. The sensor switches can be virtually any type of suitable switch known in the art for responding to a rapid deceleration (or acceleration) event, including magnetically-activated reed switches and/or hall effect switches. In one embodiment, for example, the sensor switches can be at least generally similar in structure and function to the sensor switches in U.S. patent application Ser. No. 13/170,079, filed Jun. 27, 2011, and entitled "SENSORS FOR DETECTING RAPID DECELERATION/ACCELERATION EVENTS," which is incorporated herein in its entirety by reference.

In operation, if the vehicle experiences a crash or other rapid deceleration event above a preset magnitude, the sensor switches in the crash sensor 156 close and complete their corresponding circuits. One of the sensor switches causes the programmed processor 152 to detect the occurrence of a crash event. Upon confirming that the seat belt connector 126 is properly engaged with the buckle 124 (e.g., by confirming that the seat belt switch 134 is in the "open" position), the programmed processor 152 sends a corresponding signal to a deployment circuit 158. Upon receiving a signal from the programmed processor 152, the deployment circuit 158 applies a sufficient voltage to a circuit that includes the igniter, thereby causing the inflator associated with the seat to discharge its compressed gas into the airbag 130 via the hose 140. The compressed gas expands and causes the airbag 130 to inflate and provides the seat occupant (not shown) with additional protection during the crash event.

The foregoing discussion provides a high level overview of some of the structures and functions of the airbag restraint system 100 configured in accordance with one embodiment of the present technology. Those of ordinary skill in the art will appreciate that various aspects and features of the buckle connectors and other airbag subsystems disclosed herein can be utilized in combination with other airbag systems without departing from the spirit or scope of the present technology.

Moreover, those of ordinary skill in the art will appreciate that additional airbag assemblies 110 (e.g., a second and third airbag assembly) can be operably coupled to the EMA 150 for use with the other seats in the row adjacent to the seat 112. Accordingly, in one embodiment, if a row of seats in an aircraft includes three seats, each seat could be outfitted with a seatbelt airbag assembly as described above, with each of the airbag assemblies coupled to an individual inflator as illustrated in FIG. 1. All three of the airbag assemblies, however, can be initiated by the single EMA 150.

Figure 2:
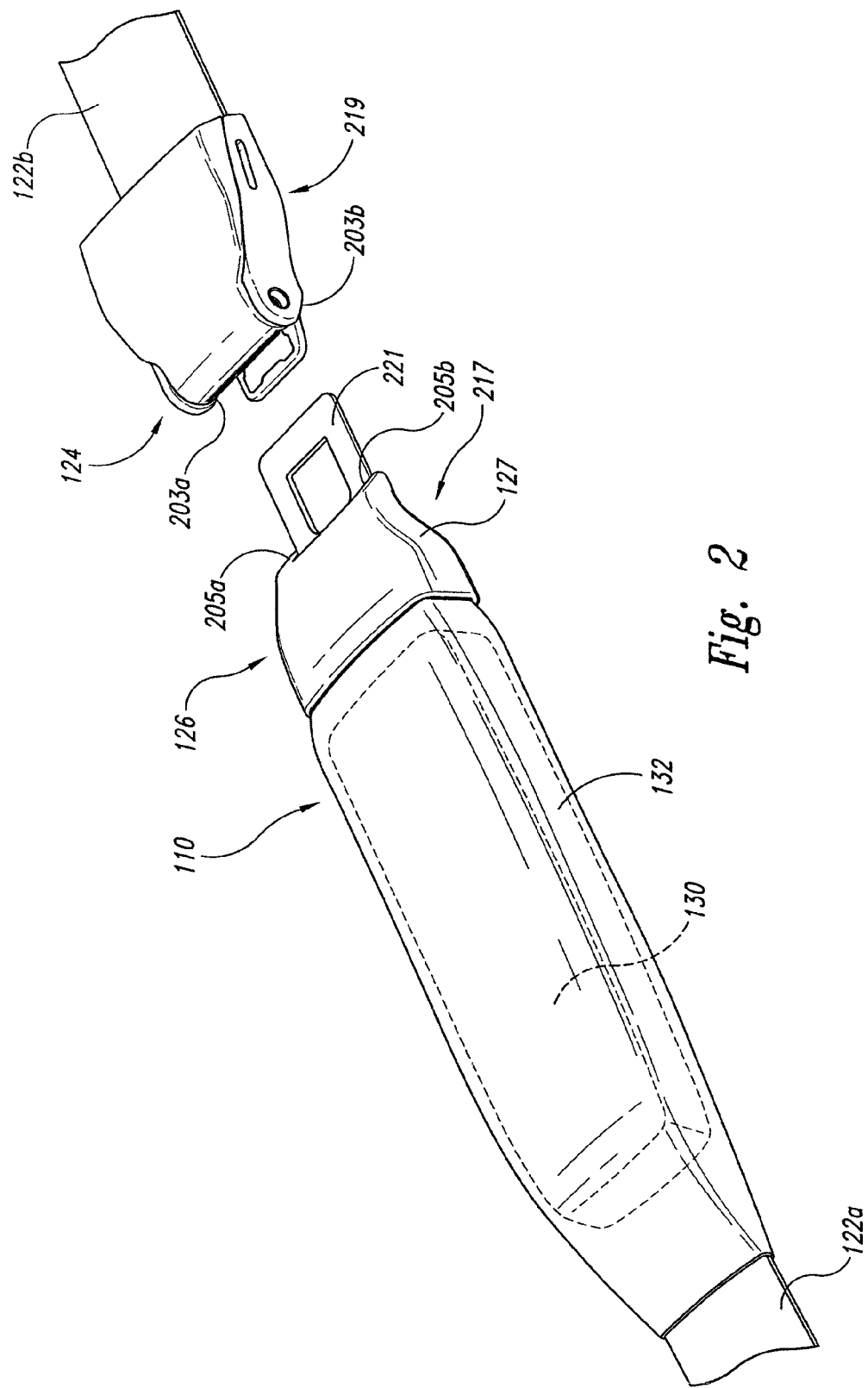
FIG. 2 is an isometric view of an airbag assembly configured in accordance with an embodiment of the present technology.

FIG. 2 is an isometric view of the airbag assembly 110 configured in accordance with an embodiment of the present technology. As described above with reference to FIG. 1, the connector 126 is attached to a distal end portion 217 of the first web portion 122a. The connector 126 includes a tongue portion 221 extending outwardly therefrom. In the illustrated embodiment, the tongue portion 221 is at least generally similar in structure and function to conventional seatbelt connector tongue portions known in the art. In other embodiments, the tongue portion 221 can have other features. A distal end portion 219 of the second web portion 122b carries the corresponding buckle 124. The buckle 124 is configured to receive and releasably engage the tongue portion 221 of the connector 126 to couple the two web portions 122a, 122b together around a seat occupant in a conventional manner.

As previously mentioned, multiple airbag assemblies 110 can be installed in a row of seats in an aircraft. In other embodiments, however, an airbag assembly 110 may be installed in a seat adjacent to another seat having a conventional seat belt without an airbag. In such an embodiment, it is desirable to ensure that the connector 126 and the buckle 124 can only be engaged with each other, and not with a buckle or a connector of another seatbelt. In the illustrated embodiment, the connector 126 and the buckle 124 are "keyed" to prevent either the connector 124 or the buckle 126 from being engaged with an unintended connector or buckle that is not keyed. For example, the connector backshell 127 includes a first back sloped or angled edge 205a and a second back sloped edge 205b. The buckle 124 includes a complimentary first forward sloped edge 203a and a complimentary second forward sloped edge 203b. The back sloped edges 205 and the forward sloped edges 203 are shaped to allow the tongue portion 221 to be fully inserted into the buckle 124. A seatbelt connector having vertical edges, or edges with other shapes, in place of the forward sloped edges 203 would prevent the full insertion of the corresponding tongue portion into the buckle 124. Similarly, a seatbelt buckle having vertical edges in place of the back sloped edges 205 would prevent the full insertion of the tongue portion 202 into the buckle. Accordingly, the keyed connector 126 and the keyed buckle 124 prevent inadvertent engagement of either the buckle 124 or the connector 126 with a non-keyed buckle or connectors.

Although the illustrated embodiment is keyed with the forward sloped edges 203 and the back sloped edges 205, other embodiments may include other features for preventing inadvertent engagement with foreign buckles or connectors. Raised portions on the tongue portion 221, for example, may engage a groove on the buckle 124. In another embodiment, an offset edge on the connector 126 can be engaged with a corresponding slot on the buckle 124. The offset edge and the corresponding slot can be configured in accordance with the systems and methods of U.S. Pat. No. 6,442,807, filed Mar. 13, 2000, and entitled, "AIRBAG BUCKLE ASSEMBLY," which is incorporated herein in its entirety by reference. Accordingly, other embodiments in accordance with the present disclosure may include keyed features that have differing shapes and/or sizes.

As described above with reference to FIG. 1, the airbag 130 is attached to the first web portion 122a generally proximate to the connector 126. The airbag cover 132 extends from the connector 126 and encloses the airbag and a length of the first web portion 122a. In several embodiments, the cover 132 is made of a suitable material, such as leather or fabric (e.g., woven nylon). As will be discussed in more detail below with reference to FIGS. 3A-4, the airbag cover 132 can extend over, or enclose, a portion of the connector 126, and the back shell 127 can enclose a distal end portion of the airbag cover 132. In some embodiments, the back shell 127 can be made of metal, such as aluminum. In other embodiments, the back shell 127 can be made from a suitable plastic, such as injection molded plastic.

Figure 3A:
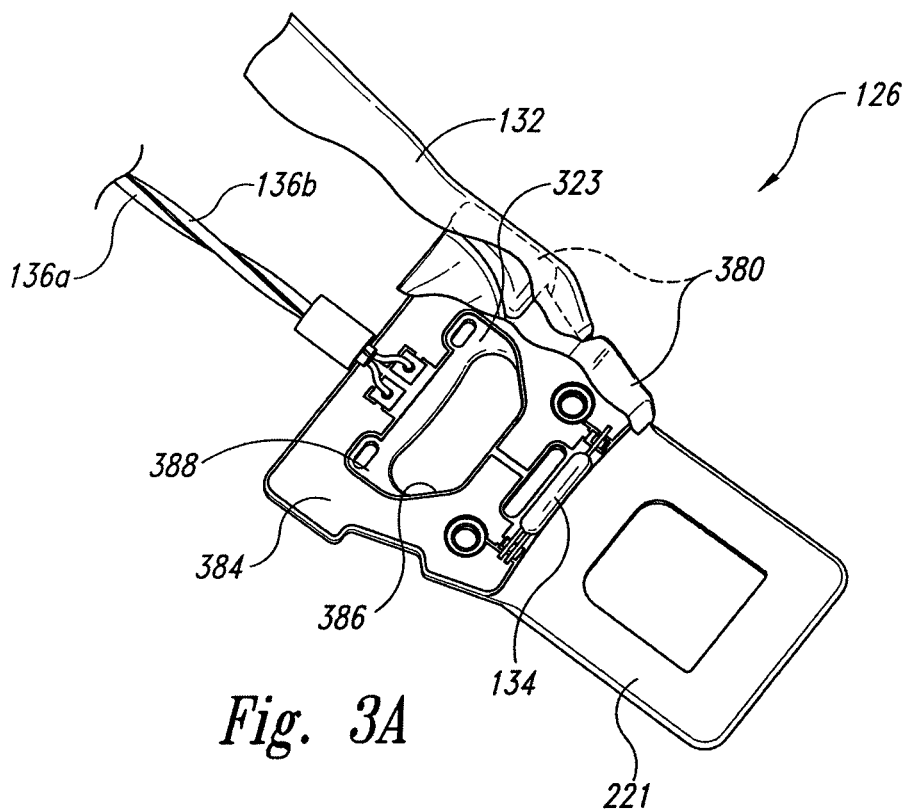
FIGS. 3A-3C are a series of isometric views illustrating various stages of assembly of an airbag seat belt connector configured in accordance with an embodiment of the present technology.
Figure 3B:
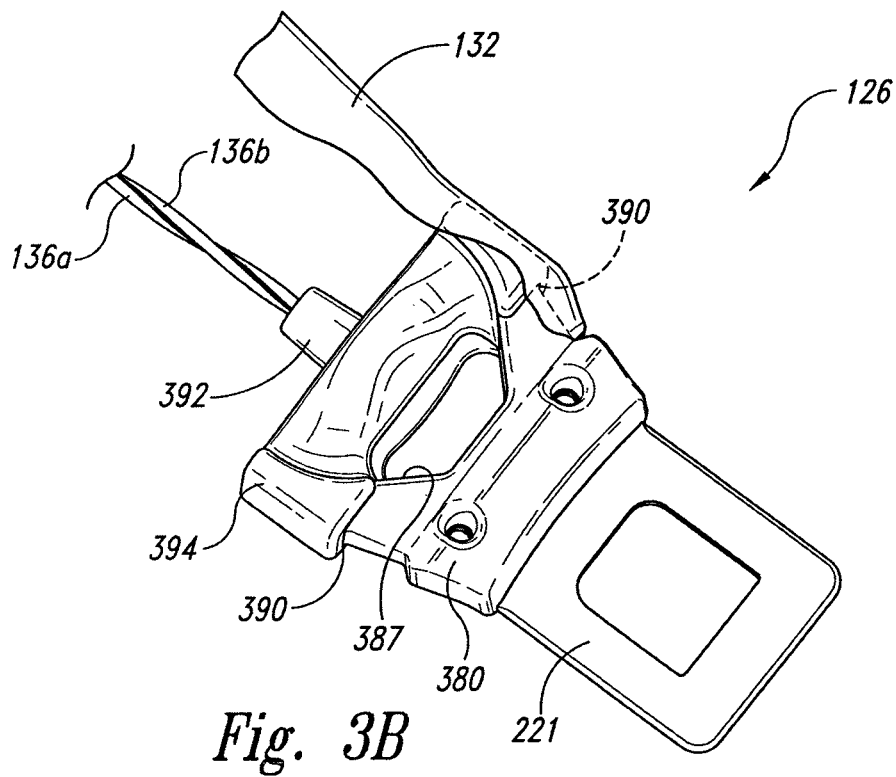
Figure 3C:
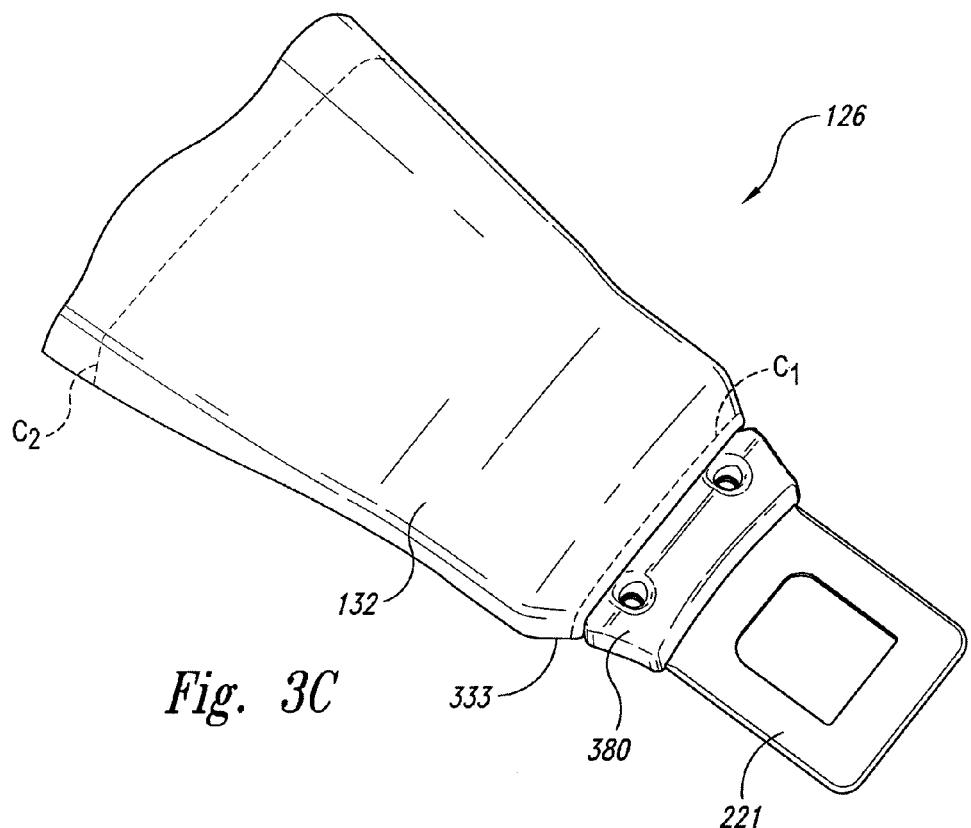

FIGS. 3A-3C are a series of isometric views of the connector 126 during various stages of assembly. Referring first to FIG. 3A, the connector 126 includes a base plate 323 which includes an aft portion 388 and the tongue portion 221 extending outwardly therefrom. The base plate 323 can be made from metal (e.g., stainless steel). In one embodiment, the base plate 323 is stamped from steel or steel alloy. A circuit card 384 can be bonded or otherwise attached to a surface on the aft portion 388 of the base plate 323. In the illustrated embodiment, the circuit card 384 at least generally follows the shape of the adjacent base plate 323. The circuit card 384 and the base plate 323 can include a web aperture 386 configured to receive a seat belt web (e.g., the distal end portion 217 of the first web portion 122a in FIG. 2).

The seat belt switch 134 is mounted to the base plate 323 and is operably connected to the wires 136a, 136b via the circuit card 384. More specifically, in some embodiments, the first wire 136a can be connected to the switch 134 via a first portion of the circuit card 384 on one lateral side of the web aperture 386. The second wire 136b can likewise be connected to the switch 134 via a second portion of the circuit card 384 on an opposite lateral side of the web aperture 386. The wires 136a, 136b can then extend proximally along the web (e.g., along the first web portion 122a shown in FIG. 2) to the electrical connector 138 (illustrated in FIG. 1). As discussed above with reference to FIG. 1, in some embodiments the switch 134 can be a normally-closed reed switch. The wires 136a, 136b can provide for input and output communication with electrical systems related to the vehicle, the airbag, and/or system diagnostics (e.g., the EMA 150 described above with reference to FIG. 1). As will become more apparent below with reference to FIGS. 3B and 3C, a housing 380 at least partially surrounds or encloses the circuit card 384, the switch 134, an aft portion 388 of the base plate 323, and a length of the wires 136a, 136b; and a distal end portion of the airbag cover 132 is secured around the housing 380.

FIG. 3B illustrates the connector 126 after the housing 380 has been positioned around the circuit card 384 and the aft portion 388 of the base plate 323 (shown in FIG. 3A). The housing 380 can be a contiguous piece of material or a plurality of segments coupled together. In some embodiments, the housing 380 is plastic. In other embodiments, the housing 380 can be made of other materials, such as metal or rubber, or a combination of materials. In a particular embodiment, the housing 380 can be a single piece of injection-molded plastic formed around the circuit card 384. In other embodiments, segments or portions of the housing 380 can be positioned around the circuit card 384 and the aft portion 388 of the base plate 323 and can be coupled together by fasteners, snaps, or other attachment mechanisms, or banded together by suitable adhesives. The housing 380, like the base plate 323 shown in FIG. 3A, can include a web aperture 387 sized to receive a seat belt web. The seat belt web can loop through the web apertures 386 and 387 to securely attach the web to the connector 126.

The housing 380 can include a body portion 394 and an outwardly-extending sleeve portion 392. The sleeve portion 392 can at least partially surround or encase a length of the wires 136a, 136b adjacent to the circuit card 384 shown in FIG. 3A. The sleeve portion 392 can be formed (e.g., molded) from the same material as the body portion 394, or can be another material (e.g., rubber, plastic, etc.) attached to the body portion 394. The sleeve portion 392 can provide support for the wires 136a, 136b where they join to the base plate 323 and reduce bending movement of the wires 136a, 136b where they join the circuit card. Accordingly, the sleeve portion 392 reduces the stress and strain on the wires 136a, 136b and acts as a "strain relief" during use of the seat belt.

In the illustrated embodiment, the housing 380 can further include one or more grooves, channels, slots, or recesses 390 configured to receive and engage a distal end portion 333 of the airbag cover 132. In the illustrated embodiment, two transverse recesses 390 are positioned on the lateral edge portions of the body portion 394. In other embodiments, the recesses 390 can be positioned in alternate locations on the housing 380 and there can be more or fewer than two recesses 390. For example, in some embodiments, the housing 380 does not have any lateral grooves or recesses 390 and the cover 132 can be attached by fasteners, friction, or other mechanisms.

Referring now to FIGS. 3B and 3C together, the cover 132 can extend from the recesses 390 and surround, or partially surround, a portion of the housing 380 proximal to the recesses 390, including a portion of the housing body 394 and the housing sleeve 392. The cover 132 can further enclose the wires 136a, 136b extending from the housing sleeve 392 along a length of the web (e.g., the web 122a shown in FIGS. 1 and 2). The cover 132 can be secured in the recesses 390 by friction, a drawstring that circles the open end of the cover 132 tight around the housing 380, snaps, hooks, pinching, Velcro®, fasteners, or other connection features that engage the cover 132 with the housing 380. In further embodiments, the cover 132 can be secured to a smooth or otherwise non-recessed portion of the housing 380, by, e.g., any of the connection features described above. In one embodiment, the cover 132 has a first circumference $C_1$ at the distal end portion 333 and a second circumference $C_2$, greater than the first circumference $C_1$, at a cross-section spaced apart from the distal end portion 333. The narrower distal end 333 of the cover 132 can provide a tightly-secured frictional fit around the housing 380 at the recesses 390.

Figure 4:
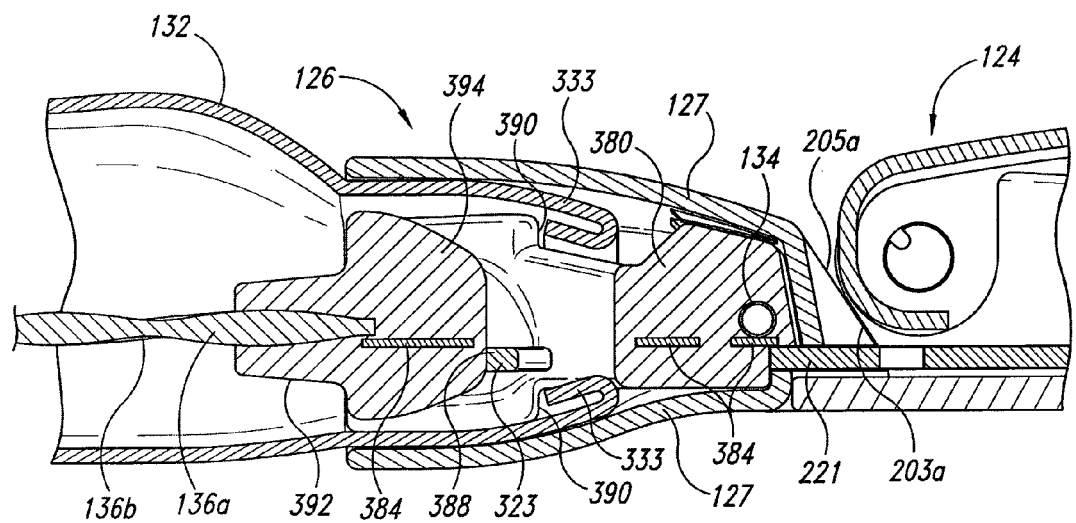
FIG. 4 is a side cross-sectional view of the connector of FIGS. 3A-3C coupled to a buckle in accordance with an embodiment of the present technology.

FIG. 4 is a side cross-sectional view of the connector 126 engaged with the buckle 124 in accordance with an embodiment of the technology. In one aspect of the illustrated embodiment, the distal end 333 of the cover 132 is positioned in the recesses 390. As described above, the circumference at the distal end 333 (e.g., the first circumference $C_1$ shown in FIG. 3C) can be approximately the same as or only slightly greater than the periphery of the housing 380 at the recesses 390. The cover 132 is accordingly frictionally held in place around the housing 380. In the illustrated embodiment, the distal end 333 of the cover 132 is doubled-over itself at the recesses 390 and the cover 132 extends away from the connector 126. As described above, the cover 132 can increase in circumference as it extends away form the connector 126. In some embodiments, a longitudinal seam of the cover 132 is stitched at the distal end 333 after the distal end 333 has been positioned around the housing 380 to hold the distal end 333 in the groove 390.

As discussed above with reference to FIG. 3C, the cover 132 can enclose at least a portion of the body and sleeve portions 394, 392 of the housing 380, the circuit card 384, the aft portion 388 of the base plate 323, and a length of the wires 136a, 136b. The back shell 127 can be coupled to the housing 380 and extend over or enclose a portion of the cover 132. The back shell 127 and housing 380 can accordingly sandwich the cover 132 therebetween and, in combination with the recesses 390 or other attachment features, further secure the cover 132 in place.

Embodiments of the present technology offer several advantages over conventional systems. The systems disclosed herein can reduce stress and/or strain in the wires 136a, 136b extending from the circuit card 384 by limiting the local bending of the wires. More specifically, the wires 136a, 136b can be surrounded at the proximal edge of the circuit card 384 by the sleeve portion 392 of the housing 380. The sleeve portion 392 can be less flexible than the wires 136a, 136b, and can therefore limit the bending movement of the wires 136a, 136b. Additional strain relief can be provided by the cover 132 which extends over a portion of the housing 380. Bending force applied to the housing 380 can accordingly be at least partially carried by the cover 132, instead of the wires 136a, 136b. In some cases, the durable cover 132 can tolerate more strain than the wires 136a, 136b. These improvements can extend the lifetime of the wires 136a, 136b and reduce repair and replacement costs.

The systems disclosed herein can additionally provide greater coverage for the seat occupant in the event of deployment. In previous systems, the connector 126 has been generally centered in the occupant's lap and the airbag 130 has been spaced apart from the connector 126. In some instances, this has caused the airbag 130 to be off-center relative to the occupant. In the present system, the cover 132 is attached to the connector 126, so the airbag 130 can be positioned closer to the connector 126 and closer to the center of the occupant.

From the foregoing, it will be appreciated that specific embodiments have been described herein for purposes of illustration, but that modifications may be made without deviating from the spirit and scope of the various embodiments of the disclosure. The recesses or grooves 390 in the housing 380, for example, can be located at different positions on the housing 380, and there can be more or fewer recesses or grooves 390. The cover 132 can be coupled to the recesses 390 or other portions of the connector 126 by fastening means other than friction. Additionally, the cover 132 can surround or partially surround more or less of the housing 380. Moreover, specific elements of any of the foregoing embodiments can be combined or substituted for elements in other embodiments. Also, the restraint systems described above can be incorporated in non-automobile or non-aircraft systems. Certain aspects of the disclosure are accordingly not limited to automobile or aircraft systems. Furthermore, while advantages associated with certain embodiments of the disclosure have been described in the context of these embodiments, other embodiments may also exhibit such advantages, and not all embodiments need necessarily exhibit such advantages to fall within the scope of the technology. Accordingly, the disclosure is not limited, except as by the appended claims.

We claim:

1. An inflatable personal restraint system for use in a vehicle, the personal restraint system comprising:
    a web configured to restrain an occupant in a seat;
    a first coupler attached to a distal end portion of the web, wherein the first coupler is configured to be releasably engaged with a second coupler to secure the web around a portion of the occupant, and wherein the first coupler includes:
        a base plate having a tongue portion configured to be operably engaged with the second coupler;
        a switch operably mounted to the base plate;
        a plurality of wires connected to the switch and extending along the web, wherein the airbag cover encloses a portion of the wires at the distal end portion of the web; and
        a housing coupled to the base plate, wherein the housing includes a groove;
    an airbag carried by the web; and
    an airbag cover at least partially enclosing the airbag, and wherein a distal end portion of the airbag cover is received in the groove to engage the cover with the housing.

2. The inflatable personal restraint system of claim 1, further comprising a back shell coupled to the housing and extending over a portion of the airbag cover.

3. An inflatable personal restraint system for use in a vehicle, the personal restraint system comprising:
    a web configured to restrain an occupant in a seat;
    a first coupler attached to a distal end portion of the web, wherein the first coupler is configured to be releasably engaged with a second coupler to secure the web around a portion of the occupant, wherein the first coupler includes a housing having a groove;
    an airbag carried by the web; and
    an airbag cover at least partially enclosing the airbag and engaging a portion of the first coupler, wherein a distal end portion of the airbag cover is frictionally secured in the groove.

4. The inflatable personal restraint system of claim 3 wherein a distal end portion of the airbag cover has a first circumference, and wherein the airbag cover further comprises a mid portion spaced apart from the distal end portion, the mid portion having a second circumference greater than the first circumference.

5. The inflatable personal restraint system of claim 3, wherein the second coupler is a buckle and wherein the first coupler includes:
    a base plate having a tongue portion configured to releasably engage the buckle;
    a switch operably mounted to the base plate; and
    a plurality of wires extending from the switch along the web, wherein the housing is coupled to the base plate, wherein the housing comprises a body portion enclosing a portion of the base plate and a sleeve portion enclosing a length of the wires, and wherein the airbag cover surrounds the sleeve portion and at least part of the body portion.

6. The inflatable personal restraint system of claim 3 wherein the vehicle is an aircraft, and wherein the web is a portion of a lap belt configured to restrain the occupant in a seat in the aircraft.

7. An inflatable personal restraint system for use in a vehicle, the restraint system comprising:
    a web configured to restrain an occupant in the vehicle;
    an airbag coupled to the web;
    one or more wires extending along the web and associated with activation of the airbag;
    an airbag cover enclosing the airbag, a portion of the web, and a portion of the one or more of the wires; and
    a connector coupled to the web proximate to the airbag, the connector comprising:
        a housing supporting a portion of the one or more wires; and
        a reed switch operably connected to a circuit card, wherein the one or more wires extend from the circuit card along the web.

8. The inflatable personal restraint system of claim 7 wherein:
    the housing includes a body portion and a sleeve portion extending proximally from the body portion;
    the body portion encases at least a portion of the circuit card; and
    the sleeve portion encloses a length of the one or more wires at a proximal end portion of the circuit card.

9. The inflatable personal restraint system of claim 7, wherein the web is a first web portion, and where the system further comprises a buckle coupled to a second web portion and configured to releasably engage the connector.

10. An inflatable personal restraint system for use in a vehicle, the restraint system comprising:
    a web configured to restrain an occupant in the vehicle;
    an airbag coupled to the web;
    one or more wires extending along the web and associated with activation of the airbag;
    an airbag cover enclosing the airbag, a portion of the web, and a portion of the one or more of the wires; and
    a connector coupled to the web proximate to the airbag, the connector comprising a housing supporting a portion of the wires, wherein the housing includes a recess, and wherein a distal end portion of the airbag cover is received in the recess.

11. A personal restraint for use in a vehicle, comprising:
a web configured to restrain an occupant in the vehicle;
a connector attached to the web, the connector having a switch and a plurality of wires operably connected to the switch and extending along the web;
an airbag coupled to the web proximate to the connector;
an airbag cover; and
means for attaching the airbag cover to the connector, wherein the means comprises a housing having a channel, wherein the airbag cover includes a distal end portion positioned in the channel.

12. The restraint of claim 11, further comprising means for reducing strain in the wires.

13. The restraint of claim 12 wherein the means for reducing strain in the wires includes the housing enclosing a length of the wires at a proximal portion of the connector.

14. The restraint of claim 11, further comprising a buckle configured to releasably engage the connector.

15. A method of manufacturing a vehicle restraint system having an airbag, the method comprising: mounting a switch to a web connector; mounting a circuit card to the web connector; operably connecting the switch to the circuit card; mounting a housing to the web connector proximate the switch, wherein the housing supports one or more wires; attaching an airbag to a web; coupling the web to the connector; securing a distal end portion of an airbag cover to the housing.

16. The method of claim 15 wherein mounting the switch comprises mounting a reed switch.

17. The method of claim 15, further comprising coupling a back shell to the housing over the airbag cover.

18. The method of claim 15 wherein securing the distal end portion of the airbag cover to the housing comprises frictionally securing a distal end portion having a first circumference to the housing, and wherein the method further comprises surrounding the airbag and a portion of the web with a mid portion of the airbag cover having a second circumference greater than the first circumference.

* * * * *